(12) United States Patent
Niendorf et al.

(10) Patent No.: US 6,672,732 B1
(45) Date of Patent: Jan. 6, 2004

(54) MICROMECHANICAL OSCILLATING DEVICE

(75) Inventors: Andreas Niendorf, Berlin (DE);
Wilhelm Frey, Palo Alto, CA (US);
Karsten Funk, Palo Alto, CA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/070,054

(22) PCT Filed: Jun. 26, 2000

(86) PCT No.: PCT/DE00/01992
§ 371 (c)(1),
(2), (4) Date: Jul. 17, 2002

(87) PCT Pub. No.: WO01/01187
PCT Pub. Date: Jan. 4, 2001

(30) Foreign Application Priority Data

Aug. 28, 1999 (DE) .................................. 199 41 045

(51) Int. Cl.⁷ .............................................. G02B 7/182
(52) U.S. Cl. .................. 359/877; 359/876; 359/872; 359/221; 359/224
(58) Field of Search ................ 359/877, 876, 359/872, 221, 224, 199, 212, 213, 230, 231, 848; 385/18, 19

(56) References Cited

U.S. PATENT DOCUMENTS 4,932,745 A * 6/1990 Blonder .................. 385/18
5,226,099 A * 7/1993 Mignardi et al. ......... 385/19
5,345,521 A    9/1994 McDonald et al.
6,215,579 B1 * 4/2001 Bloom et al. ............ 359/298

FOREIGN PATENT DOCUMENTS

| DE | 198 57 946 | 1/2000 |
| EP | 0 754 958  | 1/1997 |
| GB | 2 275 787  | 9/1994 |
| JP | 11 153761  | 9/1999 |

OTHER PUBLICATIONS

Patent Abstracts of Japan, vol. 1999, No. 11, Sep. 30, 1999*.

* cited by examiner

Primary Examiner—Mohammad Sikder
(74) Attorney, Agent, or Firm—Kenyon & Kenyon

(57) ABSTRACT

A vibrating microdevice, such as a vibrating micromirror, includes a vibrating structure which is connected to a supporting body via at least one spring structure in an at least a largely floating manner, the spring structure including at least one torsion-spring element defining a torsion axis and permitting a torsional vibration about the torsion axis to be induced in the vibrating structure, the spring structure also including at least one converter structure, which at least partially converts forces acting at least largely perpendicularly to the torsion axis on the torsion spring element into forces acting at least partially parallelly to the torsion axis on the torsion-spring element.

18 Claims, 3 Drawing Sheets

MICROMECHANICAL OSCILLATING DEVICE

FIELD OF THE INVENTION

The present invention relates to a vibrating microdevice, such as a vibrating micromirror.

BACKGROUND INFORMATION

Vibrating micromirrors, which are manufactured using surface micromechanics and have a variety of forms of springs and suspensions, are conventional. For example, German Published Patent Application No. 198 57 946 describes micro vibrating mirrors, which are used in sensing the passenger compartment of motor vehicles, in scanning, or for laser deflection.

Conventional vibrating micromirrors (e.g., those manufactured from silicon with the aid of micro-mechanical methods) are only be operated at relatively small operating or torsion angles. In order to attain operation at large torsion angles, springs, from which the actual mirror surface is suspended from a supporting body in a largely floating manner, must be designed to be very thin, since only relatively small driving forces (e.g., forces for inducing a torsional vibration) are available.

However, in the case of the mirror surfaces being relatively large in comparison to the spring thickness, externally applied forces, which, e.g., occur in response to a bump or collision, occasionally result in the destruction of the springs by breaking or tearing.

It is an object of the present invention to provide improved springs of a vibrating microdevice, in particular a vibrating micromirror. In this context, the springs may connect the actual vibrating surface to a supporting body in a largely floating manner, allow a torsional vibration of the vibrating surface, and absorb and deflect forces (e.g., external forces) that act suddenly and are directed at least partially perpendicularly to the vibrating surface, so that the springs are prevented from breaking.

SUMMARY

The vibrating microdevice according to the present invention includes spring structures that reduce the mechanical workload of the actual torsion-spring elements, especially with regard to bending stresses. This arrangement allows the torsion-spring elements to be designed thinner, which permits the use of smaller forces to induce a torsional vibration of the vibrating structure. In addition, a longer travel (i.e., greater torsion angle) may be achieved by these forces. Furthermore, the vibrating microdevice of the present invention reduces the load on the torsion-spring elements during the manufacturing process, which results in fewer losses during production.

In addition, the thin torsion-spring elements, in connection with the smaller applied forces for inducing the torsional vibration, may reduce the outlay for electronically controlling the vibrating microdevice. At the same time, the increased robustness of the vibrating microdevice according to the present invention also allows manufacturing tolerances to be reduced during the manufacturing process, so that simpler and more cost-effective manufacturing methods may be used.

In addition, the vibrating microdevice of the present invention remains robust in the case of mobile use, while simultaneously being constructed simply and having less outlay for connection techniques, which leads to cost savings.

Further, production of the microdevice according to the present invention does not require new manufacturing methods. The device may be produced completely by conventional technologies. Moreover, additionally provided converter structures may be produced in the same method step as the production of the vibrating structure and the torsion-spring elements.

The greatest mechanical load on the spring structure of the vibrating microdevice according to the present invention generally occurs in response to a sudden impact. In this context, the impact energy and the impact momentum are mainly transmitted to the vibrating structure. The vibrating microdevice and an employed converter structure of the present invention may absorb the energy stored in the movement of the vibrating structure through elastic deformation of the spring structure. Particularly, the converter structure damps the transmitted momentum, which results in the torsion-spring elements being largely subjected only to tensile stresses, which are directed essentially parallel to the torsion axis of the torsion-spring elements. These tensile stresses are uncritical and rarely lead to tears or breaks of the spring structures. Undesirable bending stresses, which frequently cause conventional torsion-spring elements to break, may be absorbed by the converter structure, partially damped, and at least partially converted to uncritical tensile or compressive stresses.

The vibrating microdevice of the present invention is capable of absorbing and tolerating markedly greater forces, including those of short duration, since the torsion of the converter structures considerably lowers the bending stress of the torsion-spring elements, especially at the transition or connection points, the critical tensile stress for the torsion-spring elements being markedly greater than the critical bending stress.

In addition, rectangular or angular transitions or structures of the converter structures or the spring structures may be rounded, resulting in a further increase in rigidity. Furthermore, the configuration of a first converter structure attached between the torsion-spring element and the supporting body may differ from that of a second converter structure attached between the torsion-spring element and the vibrating structure. Differing configurations may also be employed if a plurality of spring structures are used to connect the vibrating structure to the supporting body. The spring structures may then have different configurations as well. In this context, the term configuration includes shape of the structure, materials used, and/or material strength.

The vibrating microdevice of the present invention may also be provided with stop structures, which limit, to maximum values, a local movement of the vibrating structure from a neutral position exceeding the torsional vibration and directed parallel and/or perpendicular to the direction of the torsion axis. Consequently, the upper limits or critical maximum values of elongation or bending of the torsion-spring elements or the converter structure may be preselected, in order to prevent additional breaks or tears.

Further, the stop structures may be flexible as well, so that they are able to cushion or damp a local movement of the vibrating structure exceeding the torsional vibration, from the neutral position, parallel and/or perpendicular to the direction of the torsion axis. This provides additional protection from tearing or braking at critical loads.

DETAILED DESCRIPTION

Figure 1:
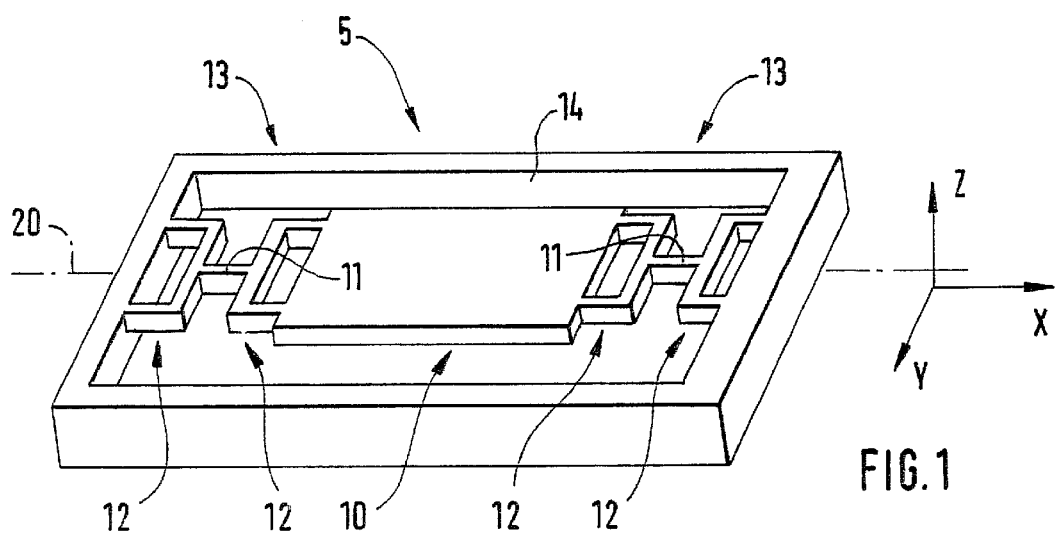
FIG. 1 illustrates an example embodiment of the present invention, in the form of a vibrating micromirror.

FIG. 1 illustrates a vibrating microdevice 5 in the form of a vibrating micromirror, including a vibrating structure 10 made of a rectangular flat plate. The plate is connected in a largely floating manner to a supporting body 14 surrounding vibrating structure 10 via two substantially identical spring structures 13 lying opposite each other. Each spring structure 13 includes a torsion-spring element 11, each of whose two ends are connected to a converter structure 12 having the shape of a handle. Converter structures 12 are directly connected to supporting body 14 or directly connected to vibrating structure 10.

In an example embodiment according to the present invention, torsion-spring elements 11 are positioned with respect to each other so that they are on a common axis that defines torsion axis 20, a torsional vibration about the torsion axis 20 being inducible in vibrating structure 10. Torsion axis 20 extends parallel to the x direction. For example, vibrating structure 10 has a width of 4000 μm, a length of 4000 μm, and thickness of 50 μm. Torsion-spring elements 11 may be 5 μm to 15 μm wide, 300 μm to 1000 μm long, and approximately 50 μm thick. In the example embodiment illustrated in FIG. 7, the length of the torsion spring element is 600 μm, and its width is 10 μm.

Furthermore, converter structures 12 typically have a thickness of 50 μm, with the width of the cross-pieces forming converter structures 12 being 10 μm to 50 μm, and a length of 100 μm to 1000 μm. In the example embodiment illustrated in FIG. 7, the length of the converter structure is approximately 600 μm and the width of the cross-pieces is approximately 15 μm.

In addition, the corner and transition regions, i.e., the regions in which converter structures 12 are connected to supporting body 14, vibrating structure 14, or torsion-spring element 11, may be rounded and widened in order to attain an increase in rigidity.

Furthermore, vibrating microdevice 5 is made of silicon, a silicon compound, or another micropatternable material, and produced using micro-mechanical patterning methods. Also provided for operating vibrating microdevice 5 are arrangements, such as electrodes, piezoelectric actuators, or magnetic actuators, which are arranged below vibrating structure 10 or extend on the surface of spring structures 13 and/or on the surface of vibrating structure 10, and produce torsional vibration of vibrating structure 10 about torsion axis 20, using electrostatically or mechanically induced forces. The torsion angle is, for example, ±10°. In addition, conventional electronic components may be provided, such as connection contacts, printed circuit traces, and evaluation and control electronics.

During operation of vibrating microdevice 5, torsion-spring elements 11 are torsionally loaded in the case of a torsional vibration about torsion axis 20, vibrating structure 10 rotating about torsion axis 20. If external forces occur, especially ones of short duration (e.g., those forces which result from a bump or crash and act on vibrating microdevice 5, e.g., in the positive or negative z direction, i.e., at least partially perpendicular to torsion axis 20), converter structures 12 may bend or twist, so that torsion-spring elements 11 are only subjected to a markedly reduced bending stress in the z direction. The bending of converter structures 12 produces uncritical tensile stress in torsion-spring elements 11.

In response to an overload of short duration or a peak load, converter structures 12 may allow a bending stress acting on torsion-spring elements 11 to be converted into a stress, which is aligned in a direction that is at least substantially parallel to torsion axis 20. This prevents torsion-spring elements 11 from breaking or tearing.

In response to torsion and bending caused by an external force in the z direction, converter structures 12 are essentially subjected to a tensile load, as well.

But, if converter structures 12 are omitted so that torsion elements 11 are each directly connected to vibrating structure 10 or supporting body 14, then a maximum bending stress, which cannot be compensated for, occurs at the ends of torsion elements 11, in response to the external force acting in the z-direction. This may often lead to breaks at these positions in response to supercritical forces.

The example embodiment illustrated in FIG. 1, may convert undesirable and critical bending stresses, which are pointed in a direction at least partially perpendicular to the direction of a torsion axis, into tolerable tensile or compressive stresses that are at least essentially parallel to a torsion axis 20.

In this context, converter structure 12 may be configured so that torsion elements 11 essentially do not experience tensile loads, but rather experience only compressive loads.

In the embodiment illustrated in FIG. 1, it is not essential to provide two torsion-spring elements 11 or spring structures 13 arranged opposite one another. Instead, one spring element 13 may be provided, which connects the vibrating structure 10 to supporting body 14 in a floating manner and supports the vibrating structure. The direction or geometry of torsion spring element 11 defines torsion axis 20. Furthermore, four spring structures may be provided, which are offset 90° with respect to each other and form diametrically opposed pairs. In this manner, two perpendicular torsion axes 20 are formed, and, in response to torsional vibrations controlled independently of each other being induced about these torsion axes 20, vibrating structure 10 traces path lines corresponding to a Lissajou figure.

Figure 2:
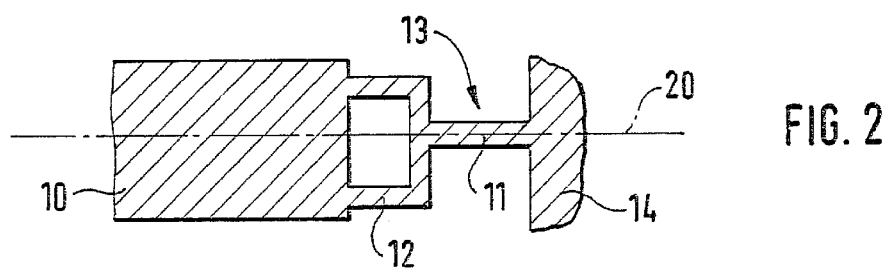
FIG. 2 is a cross-sectional view of another example embodiment of the present invention, including a modified spring structure.

FIG. 2 is a cross-sectional view of a second example embodiment of the present invention. FIG. 2 illustrates a spring structure 13, which is modified in comparison with the spring structure illustrated in FIG. 1. In particular, each spring structure 13 illustrated in FIG. 2 includes only one converter structure 12. The converter structure may be directly connected to vibrating structure 10 on one side and directly connected to torsion-spring element 11 on the other side, the torsion-spring element being directly connected to supporting body 14. However, it is possible to interchange the roles of vibrating structure 10 and supporting body 14.

Figure 3:
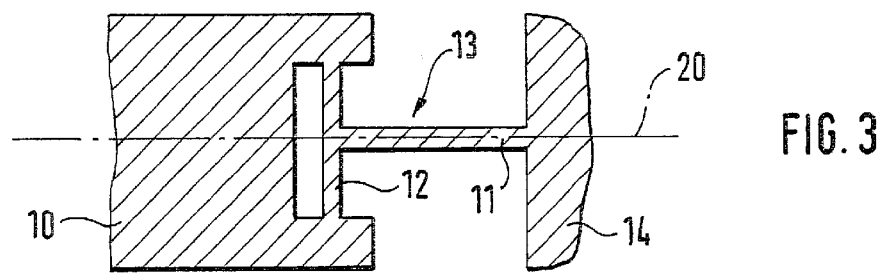
FIG. 3 is a cross-sectional view of a further example embodiment of the present invention, including a modified spring structure and a modified vibrating structure.

FIG. 3 is a cross-sectional view of a third example embodiment of the present invention. In this example embodiment, a recess is provided in vibrating structure 10, into which converter structure 12 is inserted. In comparison with the example embodiment illustrated in FIG. 2, this construction saves space needed for converter structure 12 and boosts the wafer yield. In addition, this arrangement allows torsion-spring element 11 to be lengthened in a space-saving manner. Furthermore, the roles of vibrating structure 10 and supporting body 14 may be interchanged (i.e., converter structure 12 may be inserted into a recess in supporting body 14).

Figure 4:
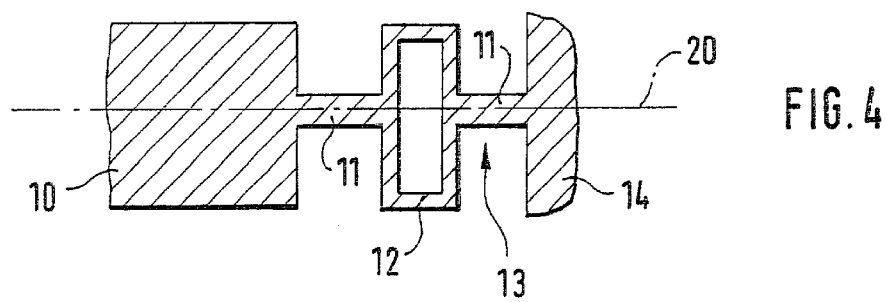
FIG. 4 is a cross-sectional view of yet another example embodiment of the present invention, including a modified spring structure.

FIG. 4 is a cross-sectional view of a fourth example embodiment of the present invention. In this example embodiment, a closed hollow contour including a rectangular periphery is provided as a converter structure 12. This hollow contour does not increase the permissible external forces, and therefore the load capacity of vibrating microdevice 5 as sharply as the example embodiments illustrated in FIGS. 1 to 3. But, it may allow coupling of driving forces via converter structure 12, in order to induce the torsional vibration in vibrating structure 10.

Figure 5:
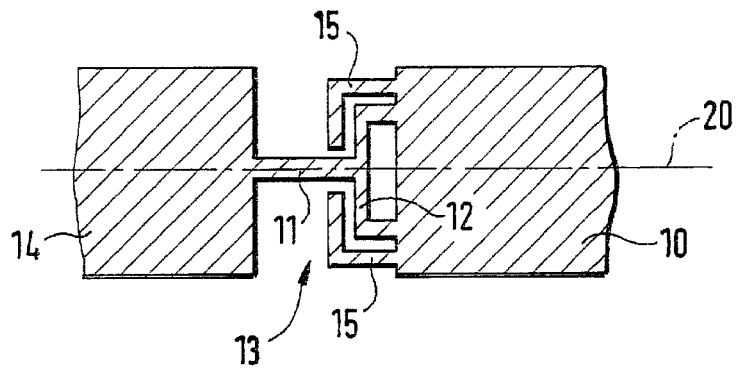
FIG. 5 is a cross-sectional view of another example embodiment of the present invention, including an additional stop structure.

FIG. 5 illustrates a modification of the example embodiment illustrated in FIG. 2. In this example embodiment, a stop structure 15, which may be made of the same material as spring structure 13, is provided. The stop structure 15 is directly connected to vibrating structure 10 in two places, while torsion-spring element 11 is directly connected to supporting body 14. Stop structure 15 may be configured to be flexible. However, it is configured as a rigid stop structure 15 as illustrated in FIG. 5. In addition, the roles of supporting body 14 and vibrating structure 10 may be interchanged.

Stop structure 15 causes a local movement of vibrating structure 10, which is from the neutral position, is parallel (x direction) and perpendicular (y direction) to the direction of torsion axis 20, is, for example, caused by impact, and exceeds the desired torsional vibration, to be limited to subcritical values.

Thus, in addition to the function of converter structure 12, the danger of breaking or overloading is prevented. The flexible or rigid design of stop structure 15, which is preferably somewhat thicker than spring structure 13, also prevents torsion-spring elements 11 from being overloaded, without impairing their functionality.

In response to a force in the z direction, which places a tensile load on torsion-spring element 11 and a bending load on converter structure 12, stop structure 15 limits the deflection of converter structure 12 and, therefore, removes load from converter structure 12. Therefore, the result is an overall load which, apart from the tensile load of torsion-spring element 11, essentially only affects stop structure 15.

Figure 6:
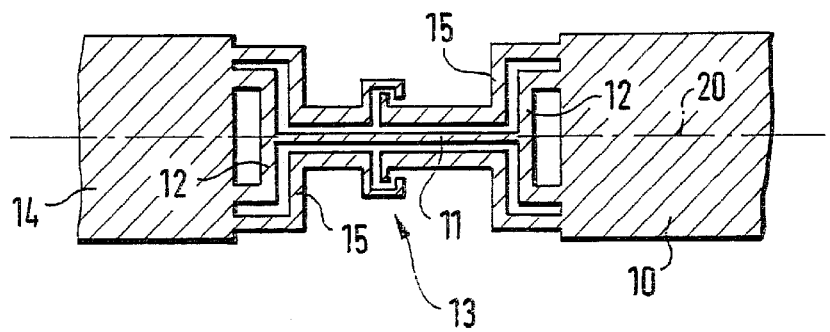
FIG. 6 is a cross-sectional view of another example embodiment of the present invention, including additional stop structures.

FIG. 6 illustrates a modification of the example embodiment illustrated in FIG. 1. FIG. 6 illustrates an example embodiment for completely protecting a spring structure 13, using appropriately placed stop structure 15.

An additional increase in rigidity may be attained by rounding off rectangular or angular transitions or structures of converter structures 12 and/or of stop structures 15.

Depending on the utilized technology and strength requirements, e.g., with regard to the shape, spring structures 13 may be connected to supporting body 15 in a different manner than that connecting spring structures 13 to vibrating structure 10.

Figure 7:
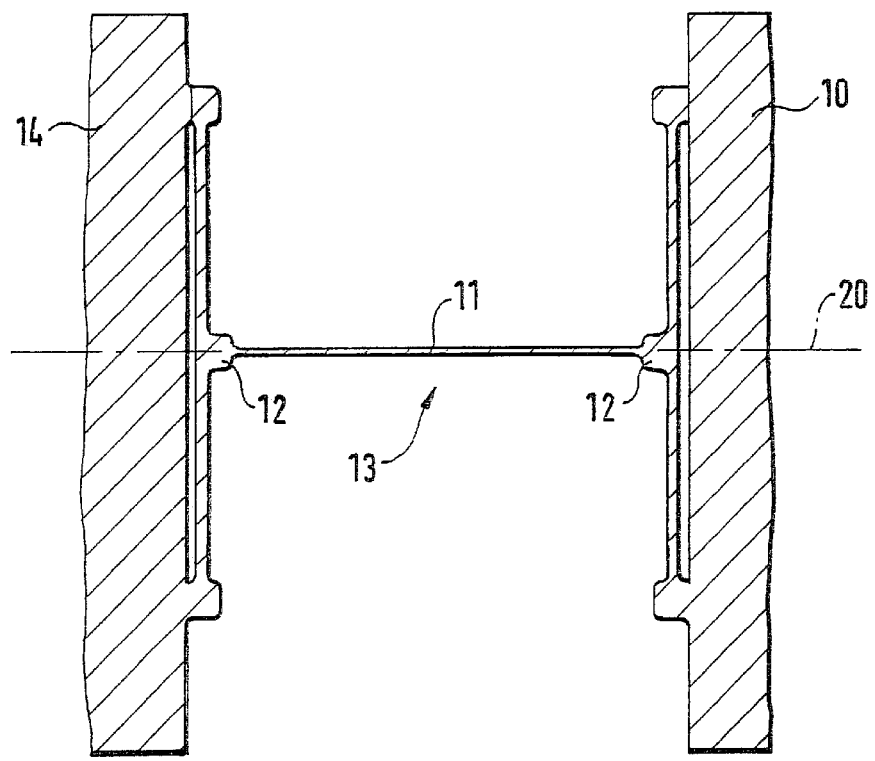
FIG. 7 is a cross-sectional view of one of the spring structures of the example embodiment illustrated in FIG. 1.

FIG. 7 illustrates one of the spring structures of the example embodiment illustrated in FIG. 1 to scale.

Figure 8:
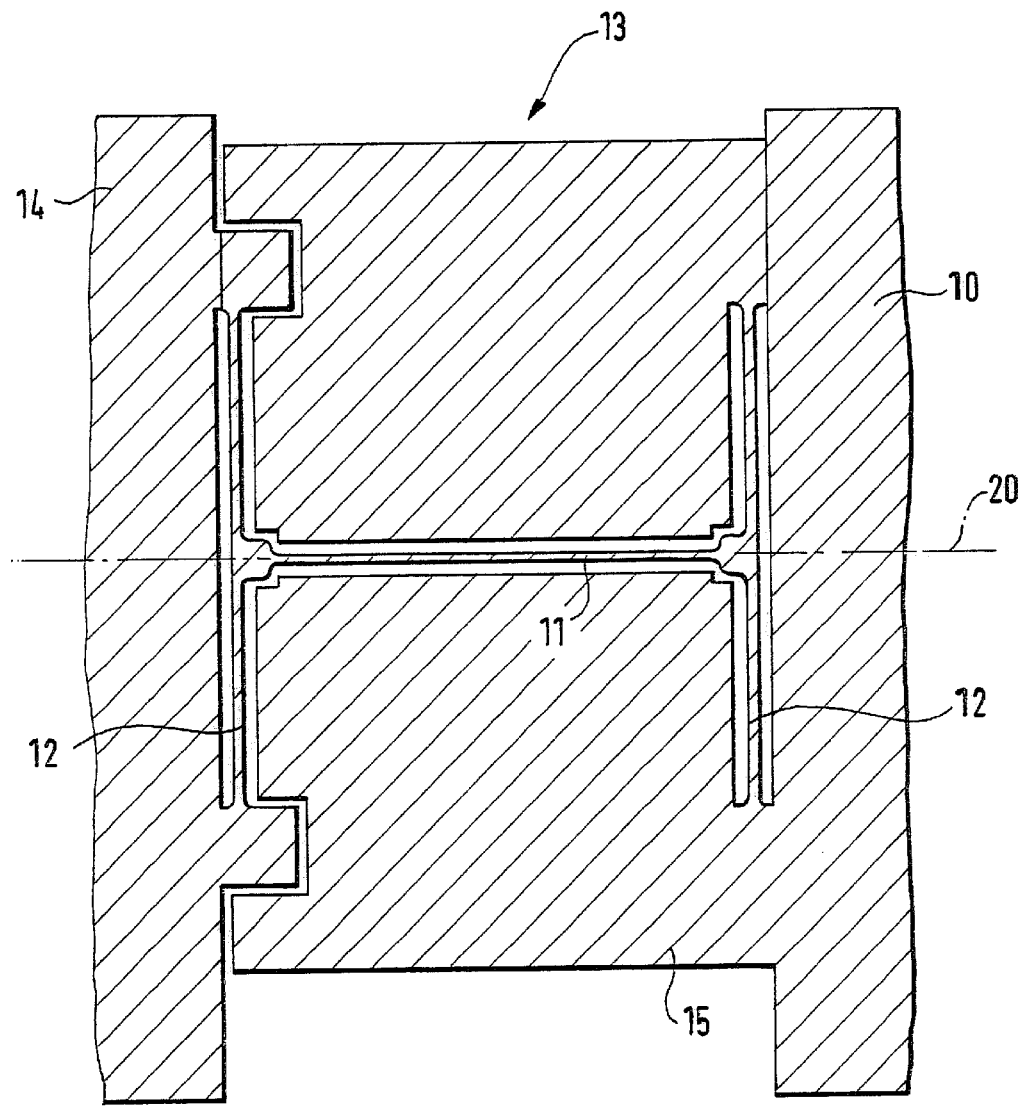
FIG. 8 is a cross-sectional view of a modification of the spring structure illustrated in FIG. 7, including an additional stop structure.

FIG. 8 illustrates a spring structure 13 including a stop structure 15, which is connected to vibrating structure 10 in a rigid manner.

What is claimed is:

1. A vibrating microdevice, comprising:

a supporting body;

at least one spring structure having at least one torsion-spring element and at least one converter structure, the torsion-spring element defining a torsion axis; and a vibrating structure connected to at least the supporting body by the spring structure in a largely floating manner, a torsional vibration of the vibrating structure inducible about the torsion axis;

wherein the converter structure at least partially converts external forces acting at least substantially perpendicularly to the torsion axis into forces acting on the torsion-spring element in a direction parallel to the torsion axis.

2. The vibrating microdevice according to claim 1, wherein the at least one converter structure is configured to at least partially convert the external forces into tensile forces acting on the torsion-spring element.

3. The vibrating microdevice according to claim 1, wherein the spring structure, the vibrating structure, and the supporting body are each made of one of silicon and a silicon compound.

4. The vibrating microdevice according to claim 1, wherein the converter structure is directly connected to at least one torsion-spring element.

5. The vibrating microdevice according to claim 1, wherein the converter structure is directly connected to one of the vibrating structure and the supporting body on one side and directly connected to the torsion-spring element on the other side.

6. The vibrating microdevice according to claim 1, wherein the converter structure is only directly connected to the torsion-spring element.

7. The vibrating microdevice according to claim 1, wherein the at least one spring structure includes one of a single spring structure, two spring structures arranged on one torsion axis and four spring structures arranged on two perpendicular torsion axis.

8. The vibrating microdevice according to claim 1, wherein the vibrating structure is a largely floating and flexibly supported mass.

9. The vibrating microdevice according to claim 1, further comprising a vibrating device configured to induce the torsional vibration of the vibrating structure.

10. The vibrating microdevice according to claim 1, wherein the converter structure is one of bow-shaped, arched, handle-shaped, and semicircular.

11. The vibrating microdevice according to claim 1, further comprising at least one stop structure, the stop structure one of flexible and rigid, the stop structure configured to limit to a maximum value a local movement of the vibrating structure from a neutral position, which is one of parallel and perpendicular to a direction of the torsion axis and exceeds the torsional vibration.

12. The vibrating microdevice according to claim 11, wherein the stop structure is connected to one of the vibrating structure and the supporting body.

13. The vibrating microdevice according to claim 1, wherein the vibrating structure includes a planar plate.

14. The vibrating microdevice according to claim 13, wherein a shape of the planar plate is one of rectangular, square, circular, and elliptical.

15. The vibrating microdevice according to claim 1, wherein the vibrating structure is formed in the shape of a concave mirror.

16. The vibrating microdevice according to claim 1, wherein the converter structure includes a closed, hollow contour.

17. The vibrating microdevice according to claim 16, wherein the closed, hollow contour includes one of a ring-shaped, elliptical, and rectangular periphery.

18. The vibrating microdevice according to claim 1, wherein the vibrating microdevice is configured as a vibrating micromirror.

* * * * *